Feb. 29, 1944.  R. G. LE TOURNEAU  2,343,150
MULTIPLE SPINDLE LATHE
Filed May 1, 1942  3 Sheets-Sheet 2
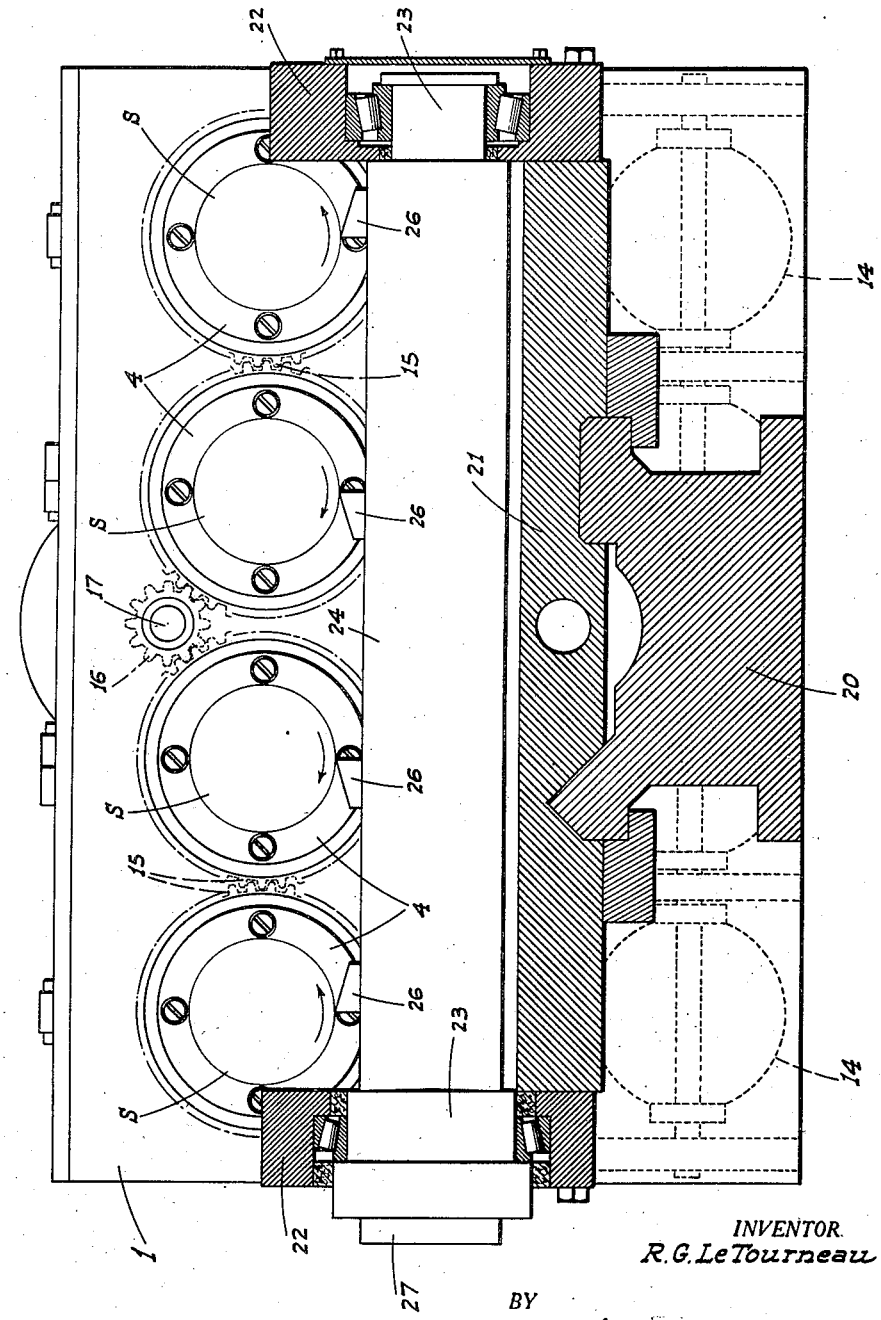
INVENTOR.
R. G. Le Tourneau
BY
ATTORNEYS

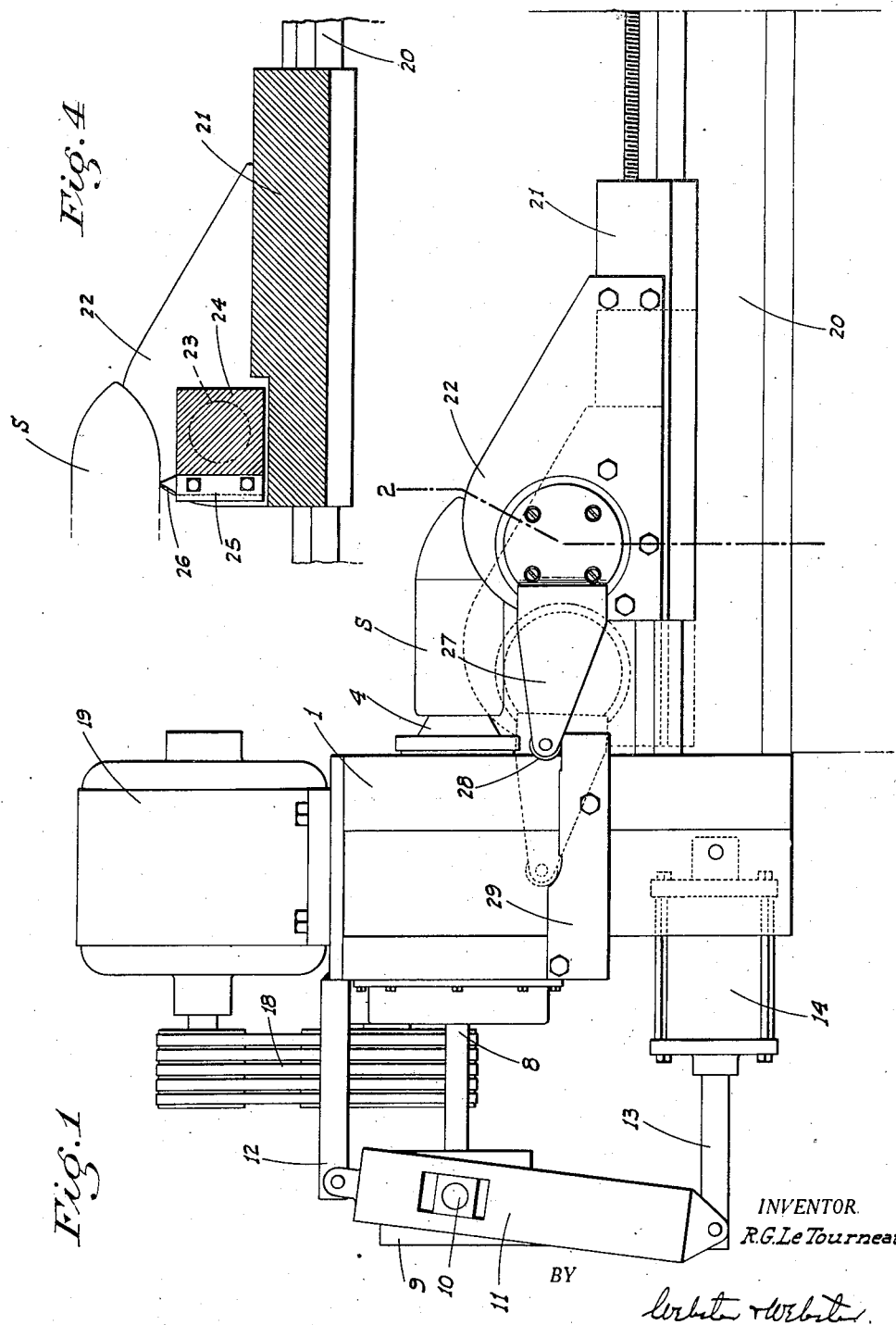

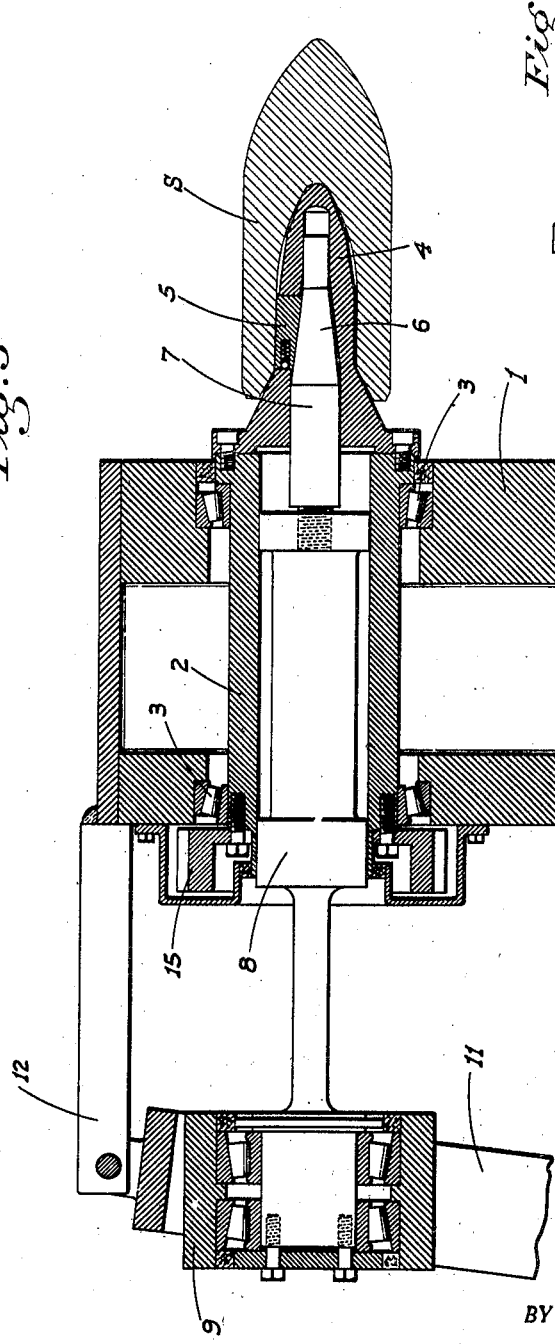

Patented Feb. 29, 1944

2,343,150

UNITED STATES PATENT OFFICE 2,343,150

MULTIPLE SPINDLE LATHE

Robert G. Le Tourneau, Peoria, Ill., assignor to R. G. Le Tourneau, Inc., Stockton, Calif., a corporation of California Application May 1, 1942, Serial No. 441,289

2 Claims. (Cl. 82—14)

This invention relates to machine lathes, one object being to provide a lathe headstock having a plurality of work-holding chucks arranged so that cutting operations may be performed on a corresponding number of separate work pieces simultaneously.

A further object is to provide what I believe to be a novel form of power actuated means for operating the work-holding chucks and holding the same in tight clamping engagement with the work.

Another object is to provide a tool holding bar adapted to be advanced and retracted relative to the work and so mounted and constructed that as the bar is advanced, the tools supported by said bar will follow a definite irregular or nonstraight path, according as the contour of the work may require.

The lathe is particularly designed for performing a certain cutting operation on the exterior of ordinance shell casings, but it may be used equally well for operations on other cylindrical objects.

These objects I accomplish by means of such structure and relative arrangement of parts as will fully appear by a perusal of the following specification and claims.

In the drawings similar characters of reference indicate corresponding parts in the several views:

Figure 1 is a fragmentary side elevation of a lathe showing the improved features, and with the tool at the start of a cutting operation.

Figure 2 is a transverse section on the line 2—2 of Fig. 1 with the spindle drive motor removed.

Figure 3 is a fragmentary longitudinal section showing a work-holding chuck and associated parts.

Figure 4 is a fragmentary longitudinal section showing the tool mounting bar.

Figure 5 is a fragmentary plan view of the tool bar detached.

Figure 6 is a side elevation of the work-holding mandrel and chuck unit detached.

Referring now more particularly to the characters of reference on the drawings, the headstock of the lathe comprises a housing 1 of suitable form having a horizontal row of identical rotary tubular spindles 2 suitably journaled in the housing, as at 3, and disposed in parallel relation lengthwise of the lathe.

Removably secured on the front face of each spindle in concentric relation therewith is a mandrel or chuck unit of the expanding type shaped to project into the interior of the work, which in this case is shown as a shell S. The mandrel includes a plurality of longitudinally extending chuck jaws 5 radially slidable in the mandrel and beveled along their inner edge. Said inner edge of all the jaws is adapted to be engaged by the corresponding tapered portion 6 of a plunger 7 slidable in the mandrel. The plunger projects into the spindle and is there removably connected with a slidable piston unit 8. The mandrel and plunger being removable, corresponding parts of other shapes and sizes may be used when handling different sizes of work.

The piston unit 8 projects beyond the rear end of the spindle and its rear end is turnable in a sleeve or collar 9, held against axial movement on the piston. The sleeve projects between and is swively connected as at 10 to the spaced arms of a depending lever 11. The lever is anchored at its upper end from the housing by suitable means as at 12, and at its lower end is connected to a piston 13 which projects rearwardly from an air cylinder 14 swively mounted on the rear side of the housing. When air is admitted to the rear end of the cylinder the piston 8 is advanced, forcing the plunger 7 ahead and spreading the jaws 5 so that the work will be firmly held. At the same time the spindle, mandrel plunger, and piston 8 may freely turn as a unit, as will be evident.

Each spindle is provided at its rear end with a gear 15. The gears of all spindles, except those of the central pair, mesh with each other as indicated in Fig. 2, while the gears of said central spindles are engaged by a drive pinion 16. This pinion is secured on a shaft 17 journaled in the housing 1 and projecting from its back side, where it is connected by a belt drive unit 18 with an electric motor 19 mounted on top of the housing.

Rigid with and projecting forwardly from the headstock is a lathe bed 20 of conventional form on which a carriage 21 is slidable, the movement of the carriage being controlled by a suitable feed screw mechanism in the usual manner. Upstanding ears 22 are mounted on opposite sides of the carriage, in which are journaled the end portions 23 of a rectangular tool bar 24 disposed on a level below the spindles and work. On its forward side the bar carries vertical sockets 25, one for each spindle and chuck, arranged to support tools 26 in proper position relative to the direction of rotation of the work, to engage corresponding work pieces supported by the chucks. The tools are thus disposed beyond the axis of rotation of the tool bar about its end portions 23 in the direction of advancing movement of the carriage, so that if said bar turns the upper or cutting end of the tools will shift up and down accordingly.

Outwardly of one ear the corresponding portion 23 of the tool bar is rigid with an arm 27 projecting toward the headstock on the corresponding side of housing I and carrying a roller 28 on its free end. This roller is adapted, when the carriage is advanced to a working position, to ride on the upper surface or edge of a cam plate or template 29 removably secured against the corresponding side of the housing and extending lengthwise of arm 27.

Since the tools lie between the axis of rotation of the tool bar and the roller 28, a downward pressure is always exerted on the roller when the tools are engaging with the work. The rollers therefore closely follow the contour of the cam plate, whose upper edge is cut according to the contour of the cut desired on the work; and since the tools shift up and down with corresponding movements of the roller as the carriage advances, a cut or finish of proper contour will be made along the rotating shells. The tool bar is of course sufficiently rigid so that torsional strains will be absorbed and all the tools along the bar will move to the same extent.

It may here be stated that shells in their course of manufacture are subjected to a number of different machining operations. The present structure is designed to perform a machining operation on a shell from a point adjacent the back end of the nose to the base or butt end of the the shell; the finishing of the nose itself being performed as a separate operation with different equipment.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a lathe, a rotary work holding chuck mounted in a fixed position, a carriage movable to and from the chuck in a plane parallel to the axis thereof, a transverse tool bar, means mounting the bar on the carriage for rotation about an axis transversely of the axis of the chuck, a tool holder on the bar spaced from the axis thereof in a direction lengthwise of the movement of the carriage, a work engaging tool mounted in said holder and means functioning upon movement of the carriage while the tool is engaged with the work to rotate the bar through a predetermined arc and control such rotation whereby the spacing of the tool from the axis of the work will be altered with the movement of the carriage.

2. In a lathe, a rotary work holding chuck mounted in a fixed position, a carriage movable to and from the chuck in a plane parallel to the axis thereof, a transverse tool bar, means mounting the bar on the carriage for rotation about an axis transversely of the axis of the chuck, a tool holder on the bar spaced from the axis thereof in a direction lengthwise of the movement of the carriage, a work engaging tool in said holder, and means functioning upon movement of the carriage while the tool is engaged with the work to rotate the bar through a predetermined arc and control such rotation whereby the spacing of the tool from the axis of the work will be altered with the movement of the carriage; said last named means comprising a radial arm secured on the bar and extending lengthwise of the direction of travel of the carriage, a roller on the outer end of the arm, and a fixed cam plate having a longitudinal surface of predetermined irregular contour, engaged by the roller when the tool is in a work engaging position.

ROBERT G. LE TOURNEAU.